United States Patent
Sekar et al.

(10) Patent No.: US 10,979,761 B2
(45) Date of Patent: Apr. 13, 2021

(54) INTELLIGENT VIDEO INTERACTION METHOD

(71) Applicants: Bharath Sekar, North York (CA); Juwei Lu, North York (CA); Peng Dai, Markham (CA); Wei Li, Markham (CA); Jianpeng Xu, Markham (CA)

(72) Inventors: Bharath Sekar, North York (CA); Juwei Lu, North York (CA); Peng Dai, Markham (CA); Wei Li, Markham (CA); Jianpeng Xu, Markham (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 10 days.

(21) Appl. No.: 16/279,230

(22) Filed: Feb. 19, 2019

(65) Prior Publication Data

US 2019/0289359 A1  Sep. 19, 2019

Related U.S. Application Data

(60) Provisional application No. 62/642,965, filed on Mar. 14, 2018.

(51) Int. Cl.
*H04N 21/433* (2011.01)
*H04N 21/4545* (2011.01)
(Continued)

(52) U.S. Cl.
CPC ... *H04N 21/4333* (2013.01); *H04N 21/23418* (2013.01); *H04N 21/440245* (2013.01); *H04N 21/45457* (2013.01); *H04N 21/4722* (2013.01)

(58) Field of Classification Search
CPC ......... H04N 21/4333; H04N 21/23418; H04N 21/440245; H04N 21/45457; H04N 21/4722
See application file for complete search history.

(56) References Cited

U.S. PATENT DOCUMENTS

2010/0241962 A1* 9/2010 Peterson ............... G11B 27/34
715/720
2011/0112665 A1  5/2011 Roberts et al.
(Continued)

FOREIGN PATENT DOCUMENTS

| CN | 104038848 A | 9/2014 |
|---|---|---|
| CN | 104065979 A | 9/2014 |
| CN | 106375860 A | 2/2017 |

OTHER PUBLICATIONS

K. Zhang, Z. Zhang, Z. Li, and Y. Qiao, "Joint Face Detection and Alignment Using Multi-task Cascaded Convolutional Networks", IEEE Signal Processing Letters, 2016.
(Continued)

*Primary Examiner* — Nasser M Goodarzi
*Assistant Examiner* — Adil Ocak

(57) ABSTRACT

A method and system for displaying data content associated with a video, comprising: receiving video data for a video at the user equipment; playing the video in a user interface rendered on a display device of the user equipment; pausing the video at a selected frame; accessing, based on the selected frame, content data associated with the selected frame; and displaying information about the content data associated with the selected frame in the user interface.

20 Claims, 14 Drawing Sheets

(51) Int. Cl.
     *H04N 21/4722*     (2011.01)
     *H04N 21/4402*     (2011.01)
     *H04N 21/234*      (2011.01)

(56) References Cited

U.S. PATENT DOCUMENTS

| | | | | |
|---|---|---|---|---|
| 2012/0078691 | A1* | 3/2012 | Tsai | G06Q 30/0241 705/14.4 |
| 2012/0308202 | A1* | 12/2012 | Murata | H04N 21/4316 386/241 |
| 2013/0290904 | A1* | 10/2013 | Hinman | G11B 27/22 715/835 |
| 2016/0094875 | A1* | 3/2016 | Peterson | H04N 21/47217 725/41 |
| 2017/0124399 | A1 | 5/2017 | Bostick et al. | |
| 2017/0229040 | A1* | 8/2017 | Joshi | G09B 21/006 |

OTHER PUBLICATIONS

O.M. Parkhi, A. Vedaldi, and A. Zisserman, "Deep Face Recognition", BMVC, 2015.

W. Liu, D. Anguelov, D. Erhan, C. Szegedy, S. Reed, C.Y. Fu, and A.G. Berg, "SSD: Single Shot MultiBox Detector", ECCV 2016.

K. He, X. Zhang, S. Ren, and J. Sun, "Deep Residual Learning for Image Recognition", CVPR 2016.

Dlib C++ Library: Easily Create High Quality Object Detectors with Deep Learning; http://blog.dlib.net/2016/10/easily-create-high-quality-object.html.

D. Potapov, "Supervised Learning Approaches for Automatic Structuring of Videos", Computer Vision and Pattern Recognition [cs.CV]. Universite Grenoble Alpes, 2015. English. <NNT:2015GREAM023>. <tel-01238100>.

\* cited by examiner

| Segment ID 302 | Start time (H:M:S:mS) 304 | End time 306 | Content Data Categories 307 | | | |
|---|---|---|---|---|---|---|
| | | | Scene 308 | People 310 | Objects 312 | Actions 314 |
| 1 | 00:00:00:00 | 00:02:12:34 | Beach | A, B, C | Golden Retriever; Water; Sand | Jogging |
| 2 | 00:02:12:34 | 00:03:08:42 | Castle | A,D | Throne; Suit of Armour | Conversation, Argument |
| 3 | 00:03:08:42 | 00:03:59:39 | Dining Hall | A,B,E | Food; Table; Dishes | Eating |
| . . . | | | | | | |
| K | 01:05:02:52 | 01:05:47:35 | Ship Deck | B,C,D | Swords, Sails, Water | Fighting |

FIG. 3

INTELLIGENT VIDEO INTERACTION METHOD

RELATED APPLICATIONS

This application claims the benefit of and priority to U.S. Provisional Patent Application No. 62/642,965 filed Mar. 14, 2018.

FIELD

The present disclosure is related to methods and systems for storing information about video files and interacting with video files.

BACKGROUND

Users who view stored video content such as movies, television shows, recorded sporting events and online videos have limited options for accessing information about the video content and for searching the content while viewing the video. At present users have option to search videos based on categories, genres, cast, and directors etc. which are manually added as meta-information to videos.

Video streaming services are becoming available that provide meta-information on content based on computer vision techniques such as face recognition. For example, Amazon Prime Video's X-Ray™ provides information on the actors in a video, allowing the bios of actors, sourced from the Internet Movie Database (IMDb), and other background information to appear on the paused screen, background information, and other information that is sourced from the Internet Movie Database (IMDb).

However the existing options do not provide users with in-depth video content searching.

SUMMARY

Methods and systems are described in this disclosure for a video viewing system that allows content based searching.

According to a first example aspect is a method for providing information about a video. The method includes: displaying a video in a user interface rendered on a display device of a user equipment; and displaying, in the user interface, a timeline that includes visual timeline markers indicating when specified content appearing in a selected segment of the video also appears in other segments of the video.

In some example embodiments of the first aspect, the selected segment of the video corresponds to a segment of the video being displayed in the user interface at a time when a pause request is detected at the user equipment, the method comprising, in response to the detected pause request, pausing the video.

In some example embodiments, each of the other segments corresponds to one of the visual timeline markers. In some examples, the method includes displaying, in response to detecting selection of one of the visual timeline markers, a segment of the video that corresponds to the selected visual timeline marker.

In some example embodiments, the method includes displaying, in the user interface, content data about the selected segment of the video, the content data including one or more labels identifying one or more of: actors appearing in the selected segment; non-human objects appearing in the selected segment; scene type of the selected segment; and actions depicted in the selected segment.

In some example embodiments, the specified content is actors, wherein the visual timeline markers indicate when an actor appearing in the selected segment of the video also appears in other segments of the video.

In some example embodiments, the visual timeline markers indicate when multiple actors appearing in a selected segment of the video also appear in other segments of the video.

In some example embodiments, determining the specified content is based on user input received at the user equipment.

In some example embodiments, the selected segment of the video and the other segments of the video are each segments that include a respective set of successive frames through which a threshold scene consistency is maintained.

In some example embodiments, stored content data is associated with the video, the content data defining the video as a plurality of successive segments that include the selected segment and the other segments, the content data including, for each of the segments, time information indicating a location and duration of the segment in the video and content labels identifying at least some of the content appearing therein. In some examples, the method includes determining which of the segments is the selected segment based on (i) a time of the video that a predetermined user input is received at the user equipment and (ii) the time information included in the content data; determining the specified content based on the content labels included in the content data for the selected segment; determining the other specified segments that include appearances of the specified content based on the content labels included in the content data for the segments; and determining locations of the visual timeline markers based on the time information included in the content data for the other segments that are determined to include appearances of the specified content.

In some example embodiments, content data for a video is generated by: splitting the video into the segments, each of the segments including a respective set of successive frames through which a threshold scene consistency is maintained; and generating the content labels for each segment based on video data included in a plurality of the successive frames included in the segment. In some examples generating the content labels for each segment includes: linking candidate human face images for each specific actor appearing in the segment across multiple frames of the segment, and using the linked candidate human face images for each specific actor to determine the label for the specific actor.

According to another example aspect is a user equipment device configured to display videos. The user equipment device includes a processing device; a display screen operatively connected to the processing device; and a memory storing instructions that configure the processing device to: display a video on the display screen of the user equipment; and display on the display screen a timeline that includes visual timeline markers indicating when specified content appearing in a selected segment of the video also appears in other segments of the video.

In some example embodiments of the user equipment device, the selected segment of the video corresponds to a segment of the video being displayed on the display screen at a time when a pause request is detected at the user equipment, and the processing device is configured to, in response to the detected pause request, pause the video, and each of the other segments corresponds to one of the visual timeline markers.

According to another example aspect is a method of providing metadata about a video from stored content data associated with the video, the content data including, for each of a plurality of successive video segments of the video, attribute information identifying at least some of the objects appearing therein. The method includes: receiving information selecting one of the segments; determining, based on the attribute information, one or more objects appearing in the selected segment; and providing, based on the attribute information, timeline information indicating other segments that also have the one or more objects appearing therein. In some examples, the objects include human faces.

According to another example aspect is a method of generating a content data file that includes meta-information for a video. The method includes splitting the video into a plurality of scene based video segments, and for each scene based video segment: linking candidate human face images for each specific actor appearing in the scene based video segment across multiple video frames of the scene based video segment, determining labels for each specific actor based on the linked candidate human face images for each specific, and storing the determined labels for the scene based video segment. In some examples, splitting the video into a plurality of scene based video segments is performed using a neural network trained to segment video based on scene variations. In some examples, the method includes splitting the video into N groups of video frames; and performing one or more of face detection, human attribute recognition and face representation in parallel on each of the N groups of video frames; wherein, for each scene based video segment, linking the candidate human face images for each specific actor is based on one or more of: face detection, human attribute recognition and face representation.

According to a further example aspect is a processing system configured to generate content data for a video. The processing system comprises: a processing device; and a memory storing instructions that configure the processing device to: split the video into a plurality of scene based video segments; and for each scene based video segment: link candidate human face images for each specific actor appearing in the scene based video segment across multiple video frames of the scene based video segment, determine labels for each specific actor based on the linked candidate human face images for each specific, and store the determined labels for the scene based video segment as part of the content data.

According to another aspect is a method and a processing system, at user equipment, for displaying data content associated with a video, comprising: receiving video data for a video at the user equipment; playing the video in a user interface of the user equipment; pausing the video at a selected frame; accessing, based on the selected frame, content data associated with the selected frame; and displaying information about the content data associated with the selected frame in the user interface; wherein the content data is determined based on machine learning algorithms.

According to a further aspect is a method and processing system, at a content source, for providing data content associated with a video, comprising: steaming video data for a video to user equipment; and providing content data to the user equipment associated with a paused video frame image, wherein the content data is determined based on machine learning algorithms.

According to another example aspect is a machine learning enabled method and system for generating content data about a video, comprising: splitting a video into N groups of video frames; segmenting the video into K scene segments using a neural network trained to segment video based on scene variations; performing face detection, human attribute recognition and face representation in parallel on each of the N groups of video frames using pre-trained machine learning algorithms; performing face tracking and representative face image selection in parallel on each of the K scene segments using pre-trained neural networks; and assigning labels to faces that appear in each of the K scene segments based on results of: (a) the performing face detection, human attribute recognition and face representation in parallel; and (b) the performing face tracking and representative face image selection in parallel on each of the K scene segments.

According to a further example aspect is a method for displaying content data associated with a video that comprises: receiving video data for a video at a user equipment; playing the video in a user interface of the user equipment; pausing the video; receiving from a content data file, in response to the pausing, content data based on a video segment that includes the selected frame; and displaying in the user interface, in response to the pausing, information from the content data for the video segment associated with the selected frame.

BRIEF DESCRIPTION OF THE DRAWINGS

Reference will now be made, by way of example, to the accompanying drawings which show example embodiments of the present application, and in which:

FIG. 3 is a table illustrating an example of possible information included in a content data file of the system of FIG. 1;

Similar reference numerals may have been used in different figures to denote similar components.

DESCRIPTION OF EXAMPLE EMBODIMENTS

Figure 1:
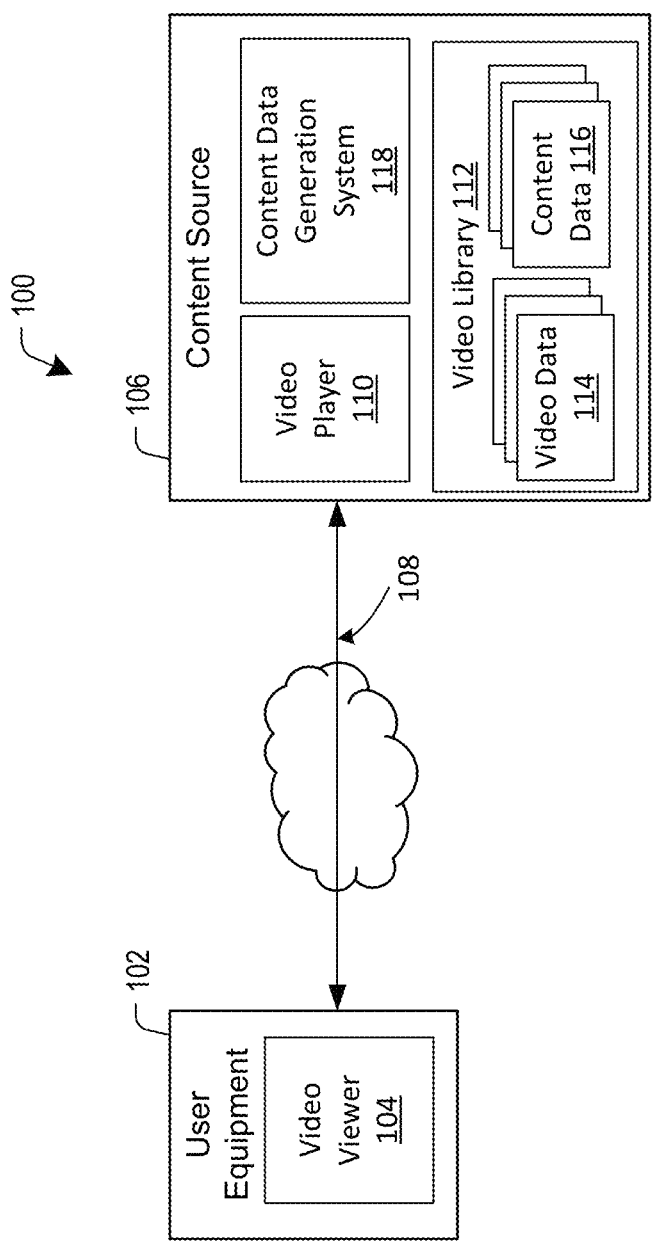
FIG. 1 is a schematic diagram illustrating an example of a video playback and indexing system according to example embodiments.

FIG. 1 is a schematic diagram of an example system 100 in which methods described herein may be implemented.

The system 100 illustrates a content source 106 and one or more user equipment 102. In the illustrated embodiment, the user equipment 102 and the content source 106 are configured to communicate with each other through communications network 108. Communications network 108 can include one or more of the Internet, cellular networks, wired and wireless service provider operated wide area networks, local wireless and wired area networks, intranets, and combinations thereof. In some examples, one or more of the functions described below in respect of content source 106 could be performed at user equipment 102 and vice versa. In some examples, the content source 106 and the user equipment 102 could be implemented on a common device.

User equipment 102 may be any component (or collection of components) capable of communicating with content source 106 and including user interfaces rendered on a display device of the user equipment that enable video viewing and user input. For example, user equipment 102 could be a mobile or stationary device such as a smartphone, personal computer such as a desktop or laptop, a smart TV, a tablet devices or any other suitably enabled device.

Figure 2:
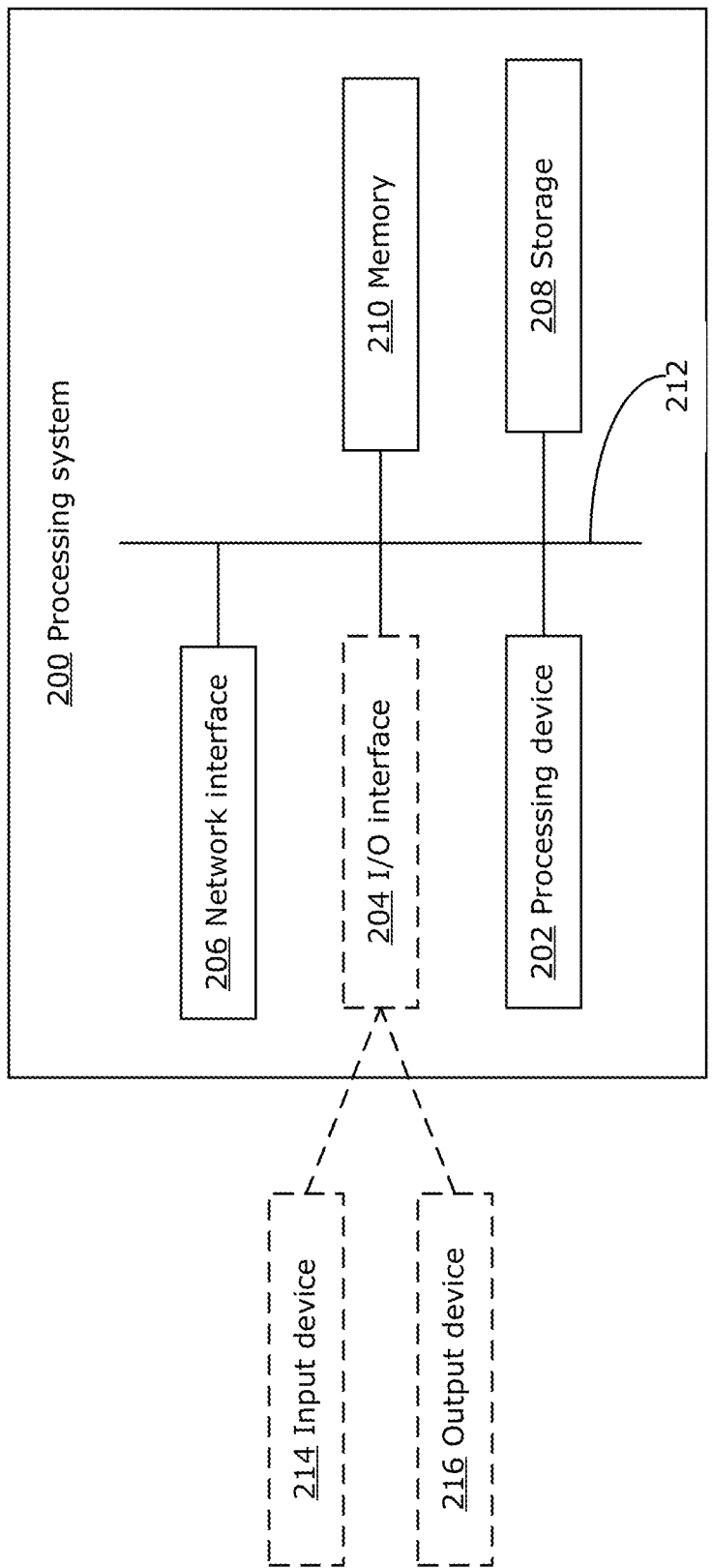
FIG. 2 is a block diagram illustrating an example processing system suitable for implementing a user devise or a content source device in the system of FIG. 1.

FIG. 2 is a block diagram of an example simplified processing system 200, which may be used to implement embodiments disclosed herein. The example processing system 200 described below, or variations thereof, may be used to implement the content source 106 or user equipment 102. Other processing systems may be suitable for implementing embodiments described in the present disclosure, and may include components different from those discussed below. Although FIG. 2 shows a single instance of each component, there may be multiple instances of each component in the processing system 200 in one or both of content source 106 and user equipment 102.

The processing system 200 may include one or more processing devices 202, such as a processor, a microprocessor, a graphics processing unit (GPU), a tensor processing unit (TPU), an application-specific integrated circuit (ASIC), a field-programmable gate array (FPGA), a dedicated logic circuitry, or combinations thereof. The processing system 200 may optionally include one or more input/output (I/O) interfaces 204, to enable interfacing with one or more optional input devices 214 and/or output devices 216. The processing system 200 may include one or more network interfaces 206 for wired or wireless communication with the communication network 108 or peer-to-peer communication with other processing system. The network interface(s) 206 may include wired links (e.g., Ethernet cable) and/or wireless links (e.g., one or more antennas) for intra-network and/or inter-network communications.

The processing system 200 may also include one or more storage units 208, which may include a mass storage unit such as a solid state drive, a hard disk drive, a magnetic disk drive and/or an optical disk drive. The processing system 200 may include one or more non-transitory memories 210, which may include a volatile or non-volatile memory (e.g., a flash memory, a random access memory (RAM), and/or a read-only memory (ROM)). The non-transitory memory(ies) 210 may store instructions for execution by the processing device(s) 202, such as to carry out example methods described in the present disclosure. The memory(ies) 210 may store other software (e.g., instructions for execution by the processing device(s) 202), such as an operating system and other applications/functions. In some examples, one or more data sets and/or modules may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 212 providing communication among components of the processing system 200, including the processing device(s) 202, optional I/O interface(s) 204, network interface(s) 206, storage unit(s) 208 and/or memory (ies) 210. The bus 212 may be any suitable bus architecture including, for example, a memory bus, a peripheral bus or a video bus.

In FIG. 2, the optional input device(s) 214 (e.g., a keyboard, a mouse, a microphone, a touchscreen integrated into or overlayed on a display device 218, and/or a keypad) and optional output device(s) 216 (e.g., a display device 218, a speaker and/or a printer) are shown as external to the processing system 200. In other examples, one or more of the input device(s) 214 and/or the output device(s) 216 may an internal component of the processing system 200. In the case of user equipment 102, input device(s) 214 will include a display device having a display screen and a user interface (UI) navigation device (for example a touchscreen input, a mouse or a handheld controller) for allowing a user to interact with items displayed by the display device.

Referring again to FIG. 1, in an example embodiment content source 106 includes one or more video content servers that store a video library 112. Video library 112 is a database of multiple video data files 114, with each video data file storing video data in a video file format. Additionally, the video library 112 also stores a respective content data file 116 for each video data file 114. Each content data file 116 includes content data or metadata for its respective video data file 114. In at least some examples, and as will be described in greater detail below, the content data file 116 for each video data file 114 is generated by a machine learning based content data generation system 118 that is generated using machine learning algorithms and sample content data. Machine learning based content generation system 118 may be implemented using neural networks, such as deep neural networks. Machine learning based content data generation system 118 is configured to generate detailed, indexed content data automatically for each video data file 114 in the video library 112.

In an example embodiment, content data file 116 stores content data using the JavaScript Object Notation (JSON) format, although other data storage formats can be used in alternative embodiments. By way of simplified example, the content data included in a content data file 116 for a video data file 114 may include information such as that identified in the table 300 shown in FIG. 3. As can be seen from the example of FIG. 3, the content data included in a content data file 116 provides meta-data that corresponds to the video content of the respective video data file 114. In the example of FIG. 3, the content data for a video is broken up into K video segments 301(1) to 301(K) that are each labelled by a respective segment ID 302. Each segment 301(1) to 301(K) is associated with a start time 304 and an end time 306 of the video data (time fields are shown as hours:minutes:seconds:microseconds in the example of FIG. 3). In example embodiments, as will be explained in greater detail below, each segment 301(j) corresponds to a video duration during which a threshold similarity level is maintained over successive video frames, which for example could be a threshold consistency in overall pixel color, background content, people content, or other content or combinations thereof.

In the example shown in FIG. 3, the content data includes content data categories 307 that are populated with information for each segment 301(1) to 301(K) such as: a scene category 308 that includes attributes that identify the segment by scene type, including for example "beach", "ship deck", "carnival", "castle", "dining hall"; a people category 310 that includes attributes that identify the actors appearing in the segment, including for example actor "A", actor "B", etc.; an object category 213 that includes one or more attributes that identify objects appearing in the scene, including for example "golden retriever", "water", "swords" etc.; and an action category 314 that includes one or more action attributes that identify a type of action occurring in the segment, for including example "jogging", "conversation", "argument", "eating", "fighting", etc. In different examples, more or fewer content data categories 307 could be included in the content data than those shown in FIG. 3. In at least some examples the content data attributes included in the content data file 116 can act as an index or link to other content data that is included in supplemental data files that are included in video library 112 or at other databases or servers. For example, the attribute "Actor A" may serve as an index or link to a bio headshot photo of Actor A and bio information about Actor A. Accordingly, on the example of FIG. 3, the meta-information included in the content data for each segment 301(1) to 301(K) includes: a segment identifier, segment timing information that specifies a location and duration of the video segment in the video (e.g. start time and end time in FIG. 3) and one or more of: a text label identifying the type of scene; text labels identifying actors appearing in the video segment; text labels identifying at least some non-human objects appearing in the video; and text labels identifying a type of action occurring in the scene.

In example embodiments, the content source 106 includes software and hardware capabilities to support a video player service 110 that interacts with user equipment 102 through communications network 108, enabling a user of user equipment 102 to view a video selected from the video library 112 and access the content data associated with the video. In example embodiments, the user equipment 102 includes a video viewer 104 for interfacing through communications network 108 with the video player service 110. The video viewer 104 may be browser implemented, or could be a dedicated application loaded and running on the user equipment 102 for accessing video player service 110.

Figure 4:
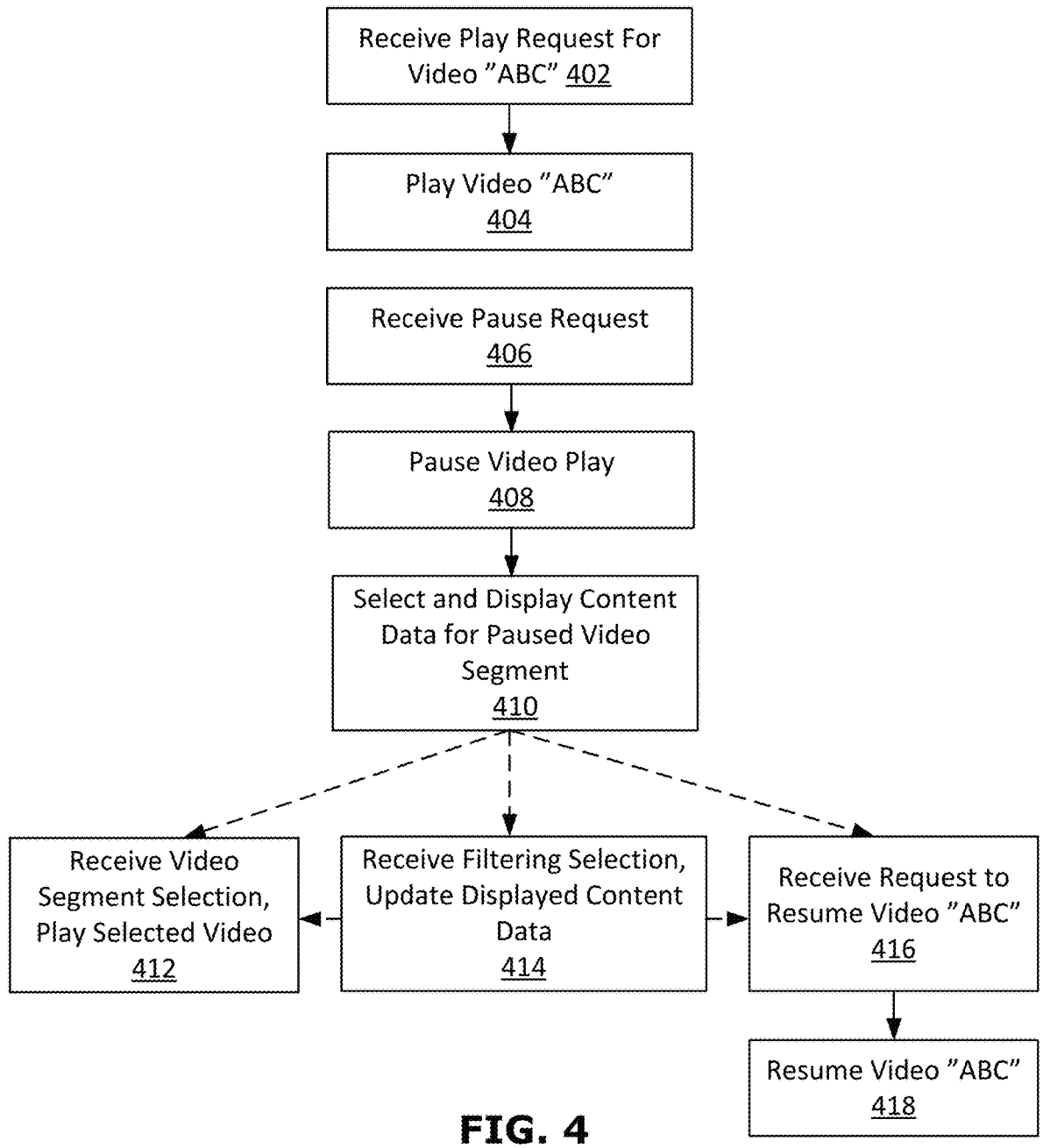
FIG. 4 is block diagram representation of actions taken in the video playback and indexing system of FIG. 1 according to example embodiments.

FIG. 4 illustrates operation of video player service 110 and video viewer 104 according to one example embodiment. As indicated at block 402, a play request is received for one of the videos (e.g. video "ABC") in video library 112. In one example, block 402 includes actions at both the video player service 110 and video viewer 104. For example, the play request can be initiated by a user selection (using the UI navigation interface) of an item (e.g., play button) from a user interface (UI) rendered by video viewer 104 on a display device of user equipment 102, resulting in a message containing the play request being transmitted over network 108 to the video player service 110. As indicated at block 404, the selected video is then played. In one example, this includes streaming, by the video player service 110, a copy of the video data for the selected video from the video data file 114 to the user equipment 102, and displaying of the video at the user equipment 102 in the UI rendered by the video viewer 104 on the display device of user equipment 102. In at least some example embodiments, the video viewer 104 buffers in the non-transitory memory(ies) 210 of the user equipment a threshold amount video data at any given time to ensure smooth video playback.

During playing of the video, video viewer 104 monitors for the occurrence of a user input requesting a pause of the video. At block 406, a pause request is received. In one example, at user equipment 102, the pause request is received upon detection of an occurrence of a predefined user pause request input, resulting in a pause request message is transmitted by the user equipment 102 to video player service 110 of content source 106. In example embodiments, an occurrence of a predefined user pause request input is detected upon user selection (using the UI navigation interface) of an item (e.g. a pause button) from the UI rendered by video viewer 104 on the display device of user equipment 102. In example embodiments the pause request message includes information indicating the time in the video at which the pause request occurred. In an example embodiment, video play is paused, as indicated at block 408. At user equipment 102, pausing video play can include continued displaying of the last image (e.g. the last video frame) from the video at the time of the pause request on a pause screen UI rendered by video viewer 104. At video player service 110 of content source 106, pausing the video play can include pausing streaming of video data to the user equipment 102.

In example embodiments, as indicated at block 410, display content data is selected and displayed for the paused video segment. In one example embodiment, the video player service 110 determines, based on the time of the pause and the content data file 116 for the video, what video segment 301(1) to 301(K) the pause has occurred within, and retrieves some or all of the content data attributes for that particular segment from the content data file 116 and sends the attributes to the video viewer 104, which then displays a visual representation of some or all of the content data attributes on the pause screen UI 500. Accordingly, the video viewer 104 accesses content data from the content data file 116 based on a selected video segment, which in the present example is the video segment being displayed at the time of pausing. In some examples, the content data attributes associated with portion of the video being played are streamed and buffered at the user equipment 102 during video play back (e.g. during block 404) such that the attributes are available at user equipment 102 immediately upon user equipment 102 receiving a pause request without requiring the video viewer 104 to obtain the content data attributes from the content source 106 after the pause occurs. In some examples, additional content data linked to the content data attributes is also provided to the video viewer 104 (e.g. a headshot image for Actor A).

Figure 5:
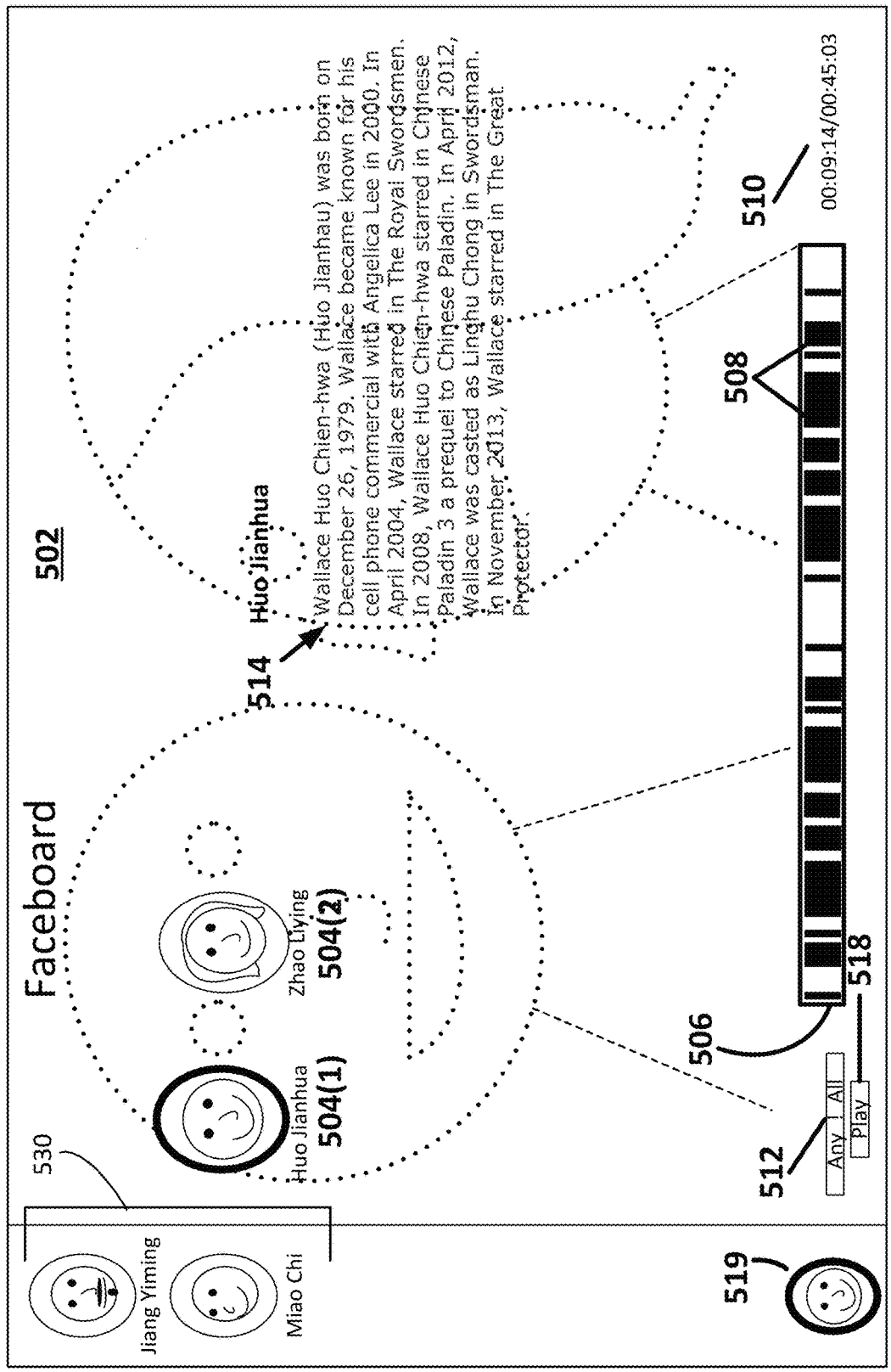
FIG. 5 is a rendering of a pause screen user interface presented by a video viewer in an example embodiment.

An example of a pause screen UI 500 rendered by video viewer 104 on user equipment 102 during block 410 in response to receipt of a pause request is illustrated in FIG. 5. As shown in FIG. 5, the UI background display 502 shows an image from the video frame (shown in dotted lined in FIG. 5 and referred to as the "paused image") that was displayed in the UI at the time that the pause request occurred. The pause screen UI 500 also shows some of the content data for the displayed segment overlayed on the image of background display 502. In particular, the displayed content data includes actor information in form of thumbnail images 504(1) and 504(2) in a "Faceboard" that identifies the two actors appearing in the paused image. In the illustrated embodiment, the actor information includes the names of the two actors appearing in the paused image, and headshots of the two actors. As shown in FIG. 5, in one example, a user can select one of the actors (for example by using a touch screen input or other on-screen navigation interface to select the actor's thumbnail image 504(1) or 504(2)) to get additional information about the actor displayed on pause screen UI 500. In the illustrated embodiment, as shown by the bold oval around the headshot of thumbnail image 504(1), the user has selected the actor "Hou JianHua", causing the video viewer 104 to display in the pause screen UI 500 supplementary content information 514 in the form of a bio for the selected actor.

The pause screen UI 500 also includes a timeline 506 for the entire duration of the video. As part of block 410, the content information parsed from content data file 116 includes an identification of all of the segments 301(1) to 301(K) (and the associated times of those segments) that the actors shown in the paused image appear in. This appearance information is used by video viewer 104 (on its own on or in conjunction with video player service 110) to highlight the displayed timeline 506 with highlight markers 508 to indicate all the segments of the video in which the actors present in the paused image appear. In at least one example embodiment, the video viewer 104 can configure the pause screen UI 500 in response to user input to display the actor appearance timeline 506 in one of three different filter modes, namely a selected actor mode, all actors mode, and any actors mode. In selected actor mode, the timeline 506 is highlighted to show the segments that the selected actor appears in. In the example illustrated in FIG. 5, as shown by the bold oval around the headshot of thumbnail image 504(1), the user has selected the actor "Hou JinHua" (using the UI navigation interface), causing the video viewer 104 to present the actor appearance timeline 506 with highlight markers 508 that indicate future appearances of actor "Hou JianHua". The selected actor is also indicated by the headshot image 519 of actor "Hou JianHua" that appears to the left of the timeline 506. Regarding the Any Actor and All Actor modes, FIG. 5 shows illustrates user selectable "Any" and "All" input options 512. Selection of the "Any" option causes the actor appearance timeline 506 to be redrawn with highlight markers 508 identifying scenes in which any of the actors from the paused image appear. Selection of the "All" option causes the actor appearance timeline 506 to be redrawn with highlight markers 508 identifying only scenes in which all of the actors from the paused image appear.

Thus, in example embodiments, the discrete visual timeline markers 508 of timeline 506 indicate when specified content appearing in a selected video segment of the video also appears in other video segments of the video. In some examples, the specified content is actors, in which case the timeline 506 functions as an actor appearance timeline that includes discrete visual timeline markers 508 indicating when an actor appearing in a selected video segment 301(j) of the video also appears in other video segments 301(1) to 301(K) of the video. The discrete visual timeline markers 508 each correspond to one of the video segments 301(1) to 301(K). As described below, in some examples the specified content can be: non-human objects; scene type; and depicted actions.

In an example embodiment time start and time end stamps can be displayed in the pause screen UI 500 for the segment 301 from which the paused image is taken. In the example of FIG. 5, time data 510 is displayed that shows: pause time/entire video duration.

Figure 6:
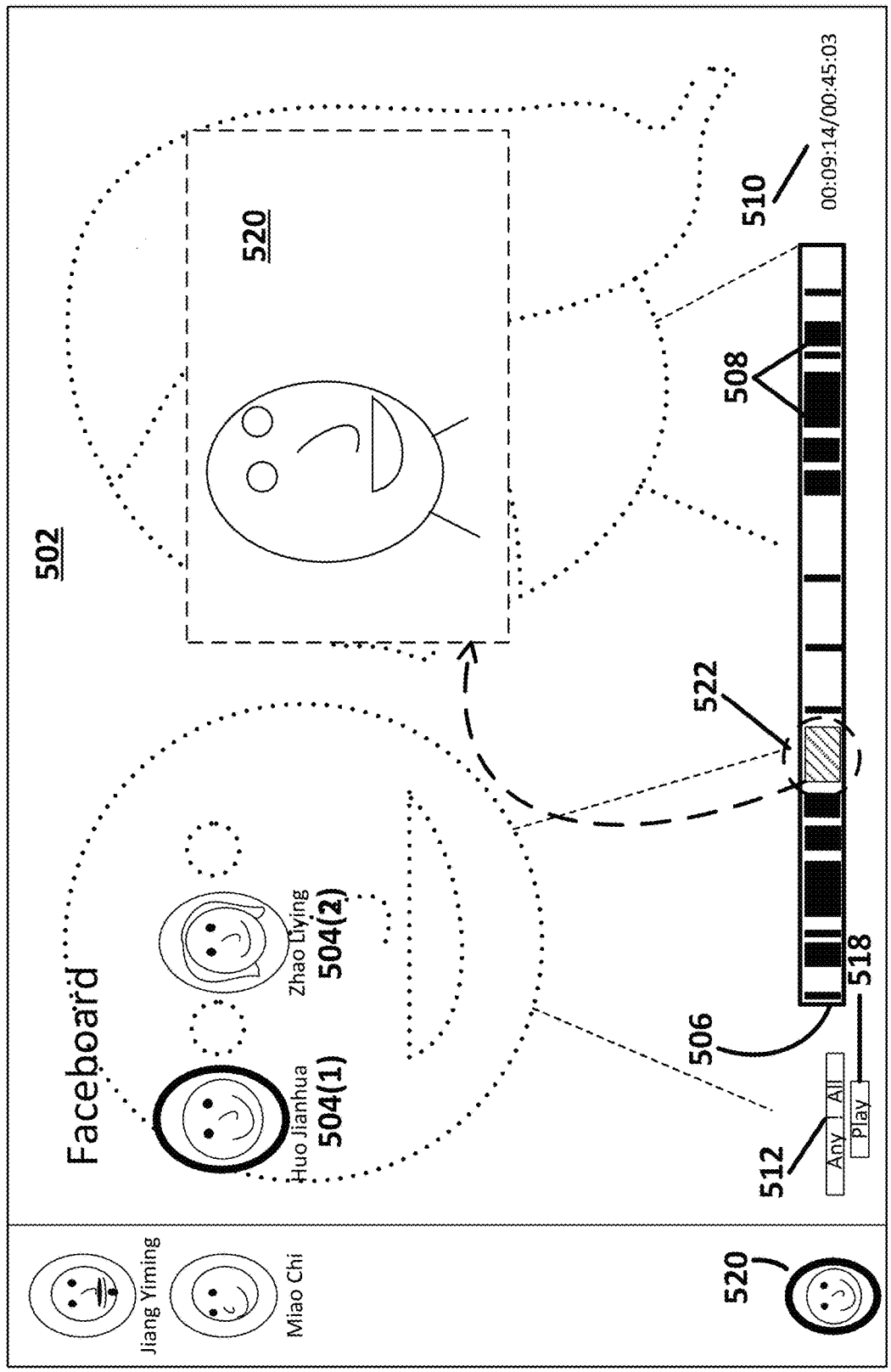
FIG. 6 is a further rendering the pause screen user interface.

Referring again to FIG. 4, in example embodiments a user can interact with the pause screen UI 500 to achieve different results. As noted above, and as indicated in block 414, the user can make filtering selections (e.g. the Any Actor, All Actor, Selected Actor modes described above), that causes the video viewer 104 to update the pause screen UI 500 accordingly. Alternatively, as indicated in block 416, a user can choose to exit the pause screen UI 500 (for example by selecting a "play" option 518) to resume the video from the currently paused location (block 418). As indicated by block 412, another option, as illustrated in FIG. 6, is for a user to select a segment indicated by a highlight marker 508 from the timeline 506 for playback. In FIG. 6, circle 522 surrounds a highlighted segment that a user has selected using the UI navigation interface (for example by a touch on a touchscreen display device or by using other on-screen navigation selection tool), which causes the selected segment to be played in a window 520 that is overlayed on the pause screen UI 500. In example embodiments, the video data for the selected segment is streamed from video player service 110. Once the selected segment is played, a number of possible alternative actions may be possible, at least some of which may be user configurable or user selectable. For example, in one configuration, the image in window 520 may be paused while video viewer 104 waits for additional user input (for example, a user input to exit the pause screen UI and resume the background video, or a user input to play another selected segment from the timeline 506). In another configuration the pause screen UI 500 could revert to what is shown in FIG. 5. In another configuration, the video viewer 104 may automatically jump to the next highlighted segment on timeline 506 and start playing it in the window 520.

In some configurations, the "any" and "all" inputs could have a different function than described above. For example, the timeline 506 could highlight all segments that include any actors from the paused image, and the input options 512 used to cause continuous successive playback in window 520 of the segments showing "any" of the actors or "all" of the actors selectively.

Figure 7:
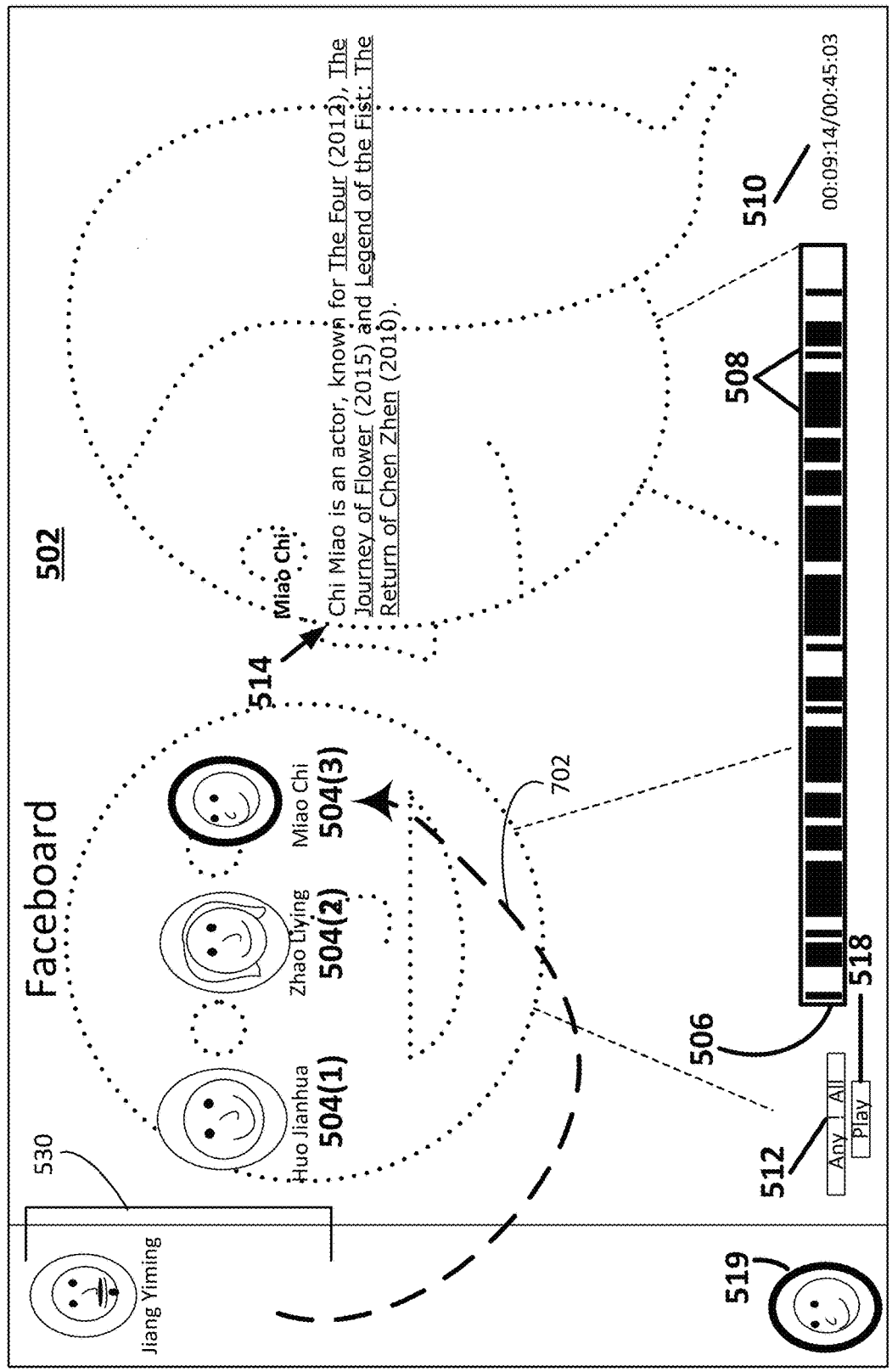
FIG. 7 is a further rendering the pause screen user interface.
Figure 8:
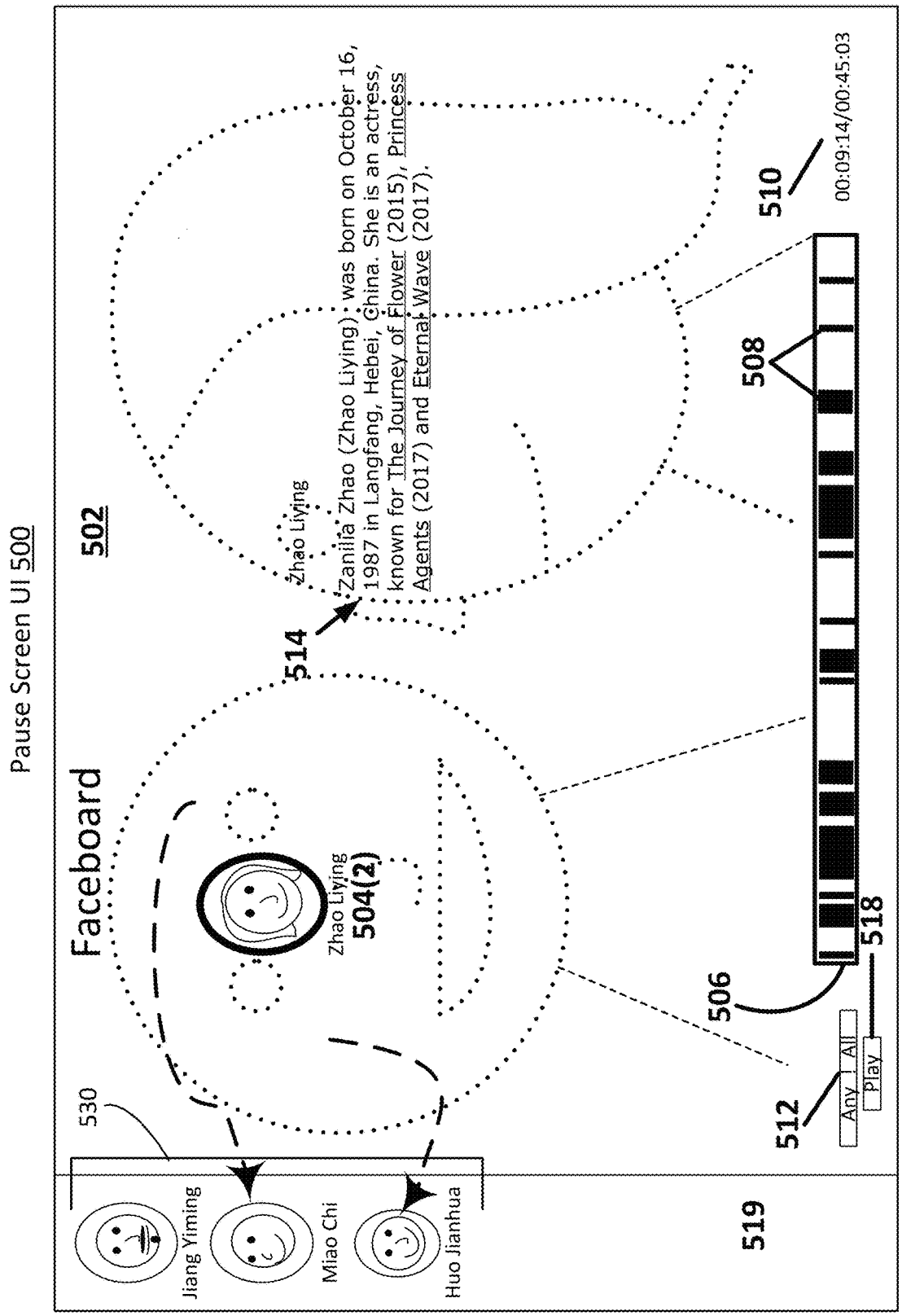
FIG. 8 is a further rendering the pause screen user interface.

As indicated in FIG. 5, in at least some examples selected actors from the video that do not appear in that particular paused image may also be displayed in a "non-present in scene" region 530 of the pause screen UI 500—shown as a column in the upper left of FIG. 5. In some examples, a user can select one of these "non-present in scene" actors and have the actor thumbnail image 504(3) moved to the "Faceboard" section of the pause screen UI 500, as shown in the case of actor "Miao Chi" in FIG. 7, and the appearance timeline 506 will be redrawn to additionally highlight all segments in which the newly added actor appears. Line 702 represents a drag-and-drop user input action to select actor "Miao Chi" from the "non-present in scene" region 530 and add him to the active "Faceboard" region of pause screen UI 500. Similarly, in example embodiments actors appearing in the "Faceboard" section can be removed and placed in the "not-present" section, and the appearance timeline 506 redrawn to remove the highlighting of segments in which only the removed actors appeared. An example of this is shown in FIG. 8 in which a user has removed actors Huo Jianhua and Miao Chi from the Faceboard.

It will thus be appreciated that in at least some example embodiments the method and system described above provides an extensive video searching and playback capabilities based on the actors who appear in a video. Such capabilities can allow improved user interaction with the user equipment 102 and the content source 106. Aside from an improved user experience, the operation of some or all of the user equipment 102, content source 106 and the communications network 108 may be improved or made more efficient by the described method and system as fewer user initiated searches may be required to access the information that is desired by the user, thereby enabling more efficient use of system resources.

Although described above in the context of the actor category of content data, the methods and systems described above can be extended to other categories of content data, including for example the scene category 308, non-people object category 312 and action category 314 described above in respect of FIG. 3, and to combinations of these categories. In such examples, the visual markers 508 could be used to indicate when other types of specified content appearing in a selected video segment 301(*j*) (e.g. the segment playing at the time of the pause request) also appear in other video segments 301(1) to 301(K). For example, the specified content indicated by markers 508 could indicate video segments that are labelled with the same scene type as the paused video segment; scene segments that include the same non-human objects as the paused video segment; and/or video segments that are depict the same actions as the paused video segment.

Figure 9:
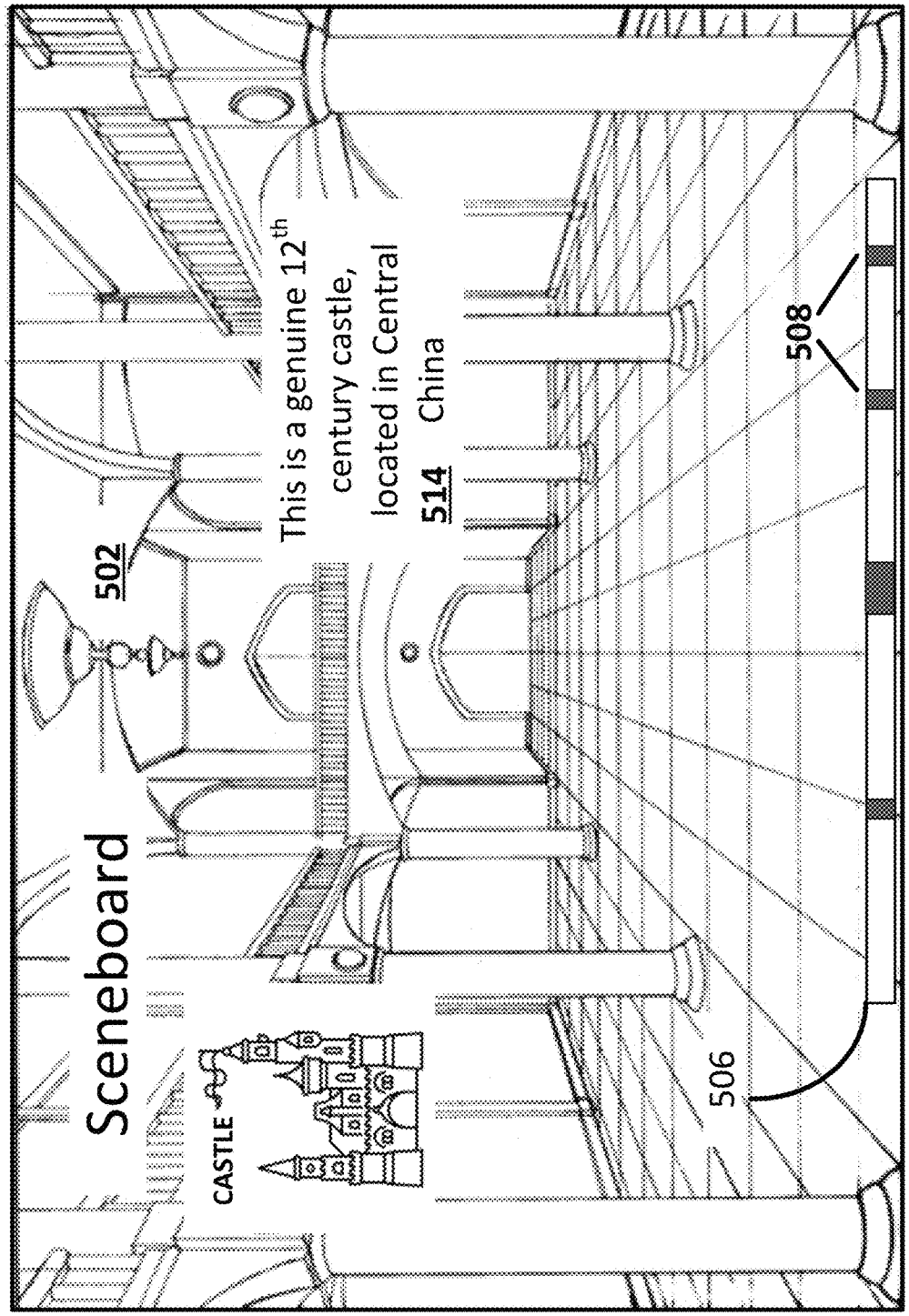
FIG. 9 is a rendering of a further pause screen user interface.

By way of example, FIG. 9 shows a further example of a pause screen UI 900 that could alternatively be generated in block 410. In the example of FIG.9, the scene category 308 of content data is displayed in a "Sceneboard" overlaying the paused video image of background display 502. The pause screen UI 900 functions in a similar manner as pause screen UI 500, except it is filtered by scene attributes rather than character attributes. The displayed content data includes the scene attribute "Castle", along with supplementary content information 514 about the scene. The timeline 506 is populated with highlight markers 508 that indicate all segments in the video that include the same scene attributes (e.g. "castle") as the paused image. As described above, a user can select a highlighted segment from the timeline for playback in a window 520.

Figure 10:
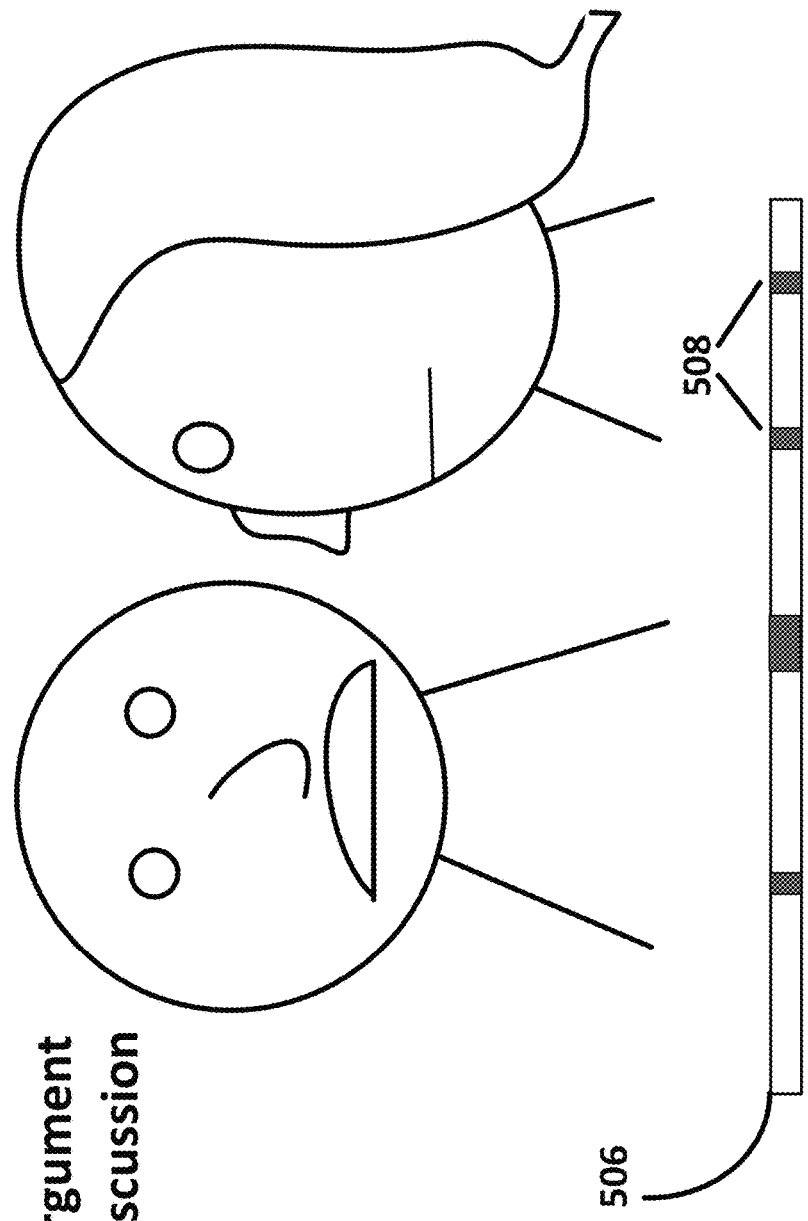
FIG. 10 is a rendering of a further pause screen user interface.

By way of example, FIG. 10 shows a further example of a pause screen UI 1000 that could alternatively be generated in block 410. In the example of FIG. 10, the action category 314 of content data is displayed in an "Actionboard" overlaying the paused video image of background display 502. The pause screen UI 1000 functions in a similar manner as pause screen UI 500, except it is filtered by action attributes rather than character attributes. The displayed content data includes the action attributes "Argument" and "Conversation". The timeline 506 is populated with highlight markers 508 that indicate all segments in the video that include the same action attributes (e.g. "argument" and "conversation") as the paused image. As described above, a user can select a highlighted segment form the timeline for playback in a window 520.

A similar pause screen UI can be can be rendered for the object category 312 of content data (e.g. an "Objectboard" UI).

Each of the Sceneboard, Actionboard, and Objectboard pause screen UIs may be configured to function in a manner similar to the Faceboard pause screen UI 500 described above. For example, in the case of multiple attributes, different filtering can be done by adding additional attributes to the board or removing them from the board as described above in respect of adding and removing actors to the Faceboard pause screen UI 500, resulting in updated timelines 506 highlighting the video segments that correspond to the selected content attributes.

Figure 11:
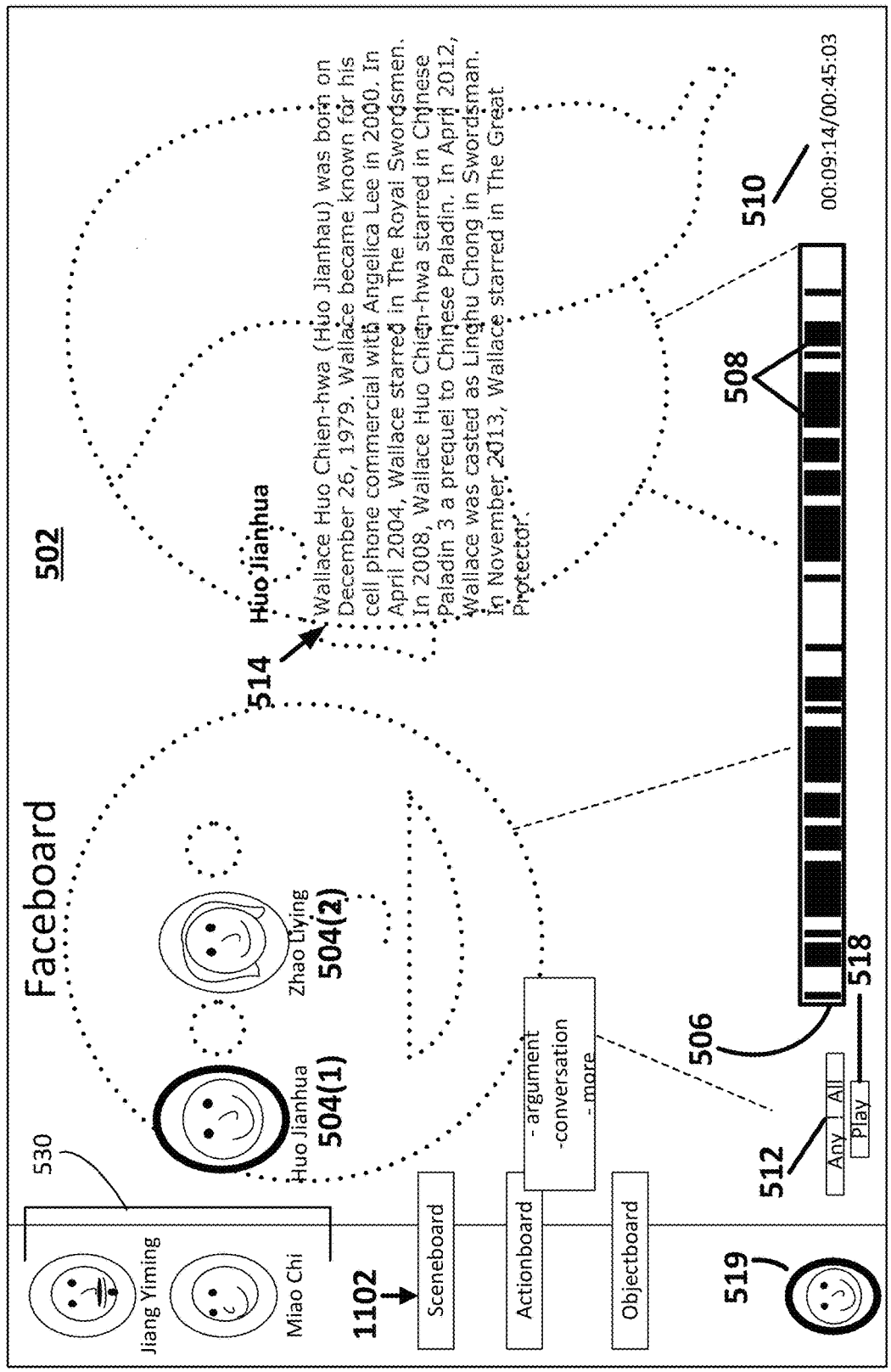
FIG. 11 is a rendering of a further pause screen user interface.

Furthermore, in some example embodiments the pause screen UI may be configurable to combine content data display and filtering from multiple categories. By way of example, FIG. 11 illustrates a further embodiment of Faceboard pause screen UI 500A. Faceboard pause screen UI 500A functions the same as pause screen UI 500, however, it includes user selectable options to add timeline filtering based on one or more selected scene, action and object content attributes in addition to actor attributes. In particular, a user can select from among the Sceneboard, Actionboard and Objectboard options 1102 to add additional filtering to the timeline 506. By way of example, a user selecting the Actionboard option (using the UI navigation interface) will be presented with the action attributes associated with the paused image ("argument", "conversation"). The user can select one or both of these attributes (for example "argument"). Upon the video viewer 104 of user equipment 102 detecting selection of one or both of the attributes, the video viewer 104 updates the timeline 506 to highlight the segments that include the combination of two actors shown on the Faceboard engaged in an argument. In some examples, the user may be given the option to apply filtering by attributes that are not shown in the paused scene, for example, by selecting "more", which will present the user with a list of other selectable action attributes (for example "fighting"). Accordingly, various permutations and combinations of filtering options can be applied based on one or more categories to generate a timeline 506 with highlight markers 508 indicating segments that correspond to the user specified filtering conditions. The user can then selectively view the highlighted segments.

Although the above description has focused on streaming, in at least some examples a video data file 114 and is associated content data file 116 are downloaded to the user equipment 102 for offline viewing. In such cases, in some examples only a subset of the content described above may be presented, for example actor names without headshots, in the event that the user equipment 102 cannot link to additional sources for the supplementary content.

In the examples described above, the detection of a pause input requesting pausing of the video is used as the trigger event for determining the selected video segment that serves as the basis for determining what other video segments are represented by highlight markers 508. In other example embodiments, other predetermined user events inputs or events could be used as the trigger for determining the selected video segment. For example, a timeline display selection button could be included in the user interface display 502 that could be selected by a user to cause a timeline to be displayed that has highlight markers 508 determined based on the content of the video segment being shown at the time of selection of the timeline display selection button, without any pausing of the video occurring.

As noted above, video searching has traditionally been restricted based on meta-information such as title, genre, actors, creators etc. that is stored manually about the videos. The system and method described above provides users with options to consume video based on the content information. In some examples, computer vision techniques such as face, object and scene and action recognition may be used to generate some or all of the information included in content data files 116 for video data, enabling a system in which users can be provided with frame by frame (scene by scene) content information and options to browse videos based on filters applied on the content information. As described above, in example embodiments include face based information & search (Faceboard), scene based information & search (Sceneboard), object based information & search (Objectboard), and action based information & search (Actionboard), as well as combinations of these categories. Some example applications may enable users to: select scenes only a particular Actor occurs in; select scenes of a particular type, say a beach/carnival/castle; search for scenes in which a particular object appears; search for scenes which has a particular action ex: Fight scenes; and search for scenes having a combination of above search options ex: search for all the scenes in which a particular actor fights.

In the Faceboard example, based on the recognized face information of a particular scene, users can be provided with information of actors and options to browse through the video based on the recognized faces/actors. Users are provided with information about the actors in a particular scene, which can provide an interactive and dynamic user experience while watching videos. In the Sceneboard example, based on the recognized scene information of a particular scene, users can be provided with information of the scene and options to browse through the video for similar scenes. In the Objectboard examples, based on the recognized object information of a particular scene, users can be provided with information of the objects in the scene and options to browse through the video for similar objects in the video. In the Actionboard example, based on the recognized actions in a particular scene, users are provided with options to browse through the video for similar actions.

Example embodiments provide information about the current scene based on machine learned information about categories such as actors, scene, objects and actions. In at least some applications, enhanced searching based on video content information is enabled (e.g. searching for all scenes that include selected people or objects).

In example embodiments, the video viewer 104 and video player service 110 rely on content data that has been generated by a machine learning based content generation system 118 from a video. The machine learning based content generation system 118 is generated using machine learning algorithms and sample content data. The machine learning based content generation system may be implemented using one or more neural networks, such as a deep learning neural network. There have been developments in machine learning based systems for categorizing and labeling video data, including for example technologies that are based on face recognition technologies. Typically, existing face recognition systems are implemented using deep neural networks which have been trained using sample data to detect faces in images. The trained face recognition system receives each frame in a video, performs face detection, and outputs cropped human face images in each frame. Each cropped human face image is then sent to face recognition system that is implemented using a deep neural network and trained to recognize human faces using sample data comprising labeled human face images. The face recognition system receives a human face and generates a representation vector of the human face image, which is compared with representation vectors of known face images for face recognition. However, one problem of existing face recognition systems is that there is a high variance of recognition accuracy, because: (a) people recognition is only based on single cropped face images without considering corresponding face images appearing in neighboring frames; (b) recognition accuracy is dramatically reduced for profile faces, poorly illuminated faces, low-resolution faces, or made-up faces; and (c) other human attributes such as hairstyles and clothing are difficult to integrate with faces to improve recognition accuracy. Another problem of existing face recognition systems is the difficulty of trading off between recognition accuracy and performance, because (a) video processing speed is limited by face detection and recognition speed; and (b) when using traditional methods such as skip-frame processing to improve speed, the recognition accuracy can be dramatically reduced.

As noted above, in at least some example embodiments the content data file 116 that is associated with each video data file 114 is generated by a machine learning based content data generation system 118. An example of a machine learning based content data generation system 118 enables detailed, indexed content data to be automatically generated for each video in the video library 112, will now be described in greater detail.

Figure 12:
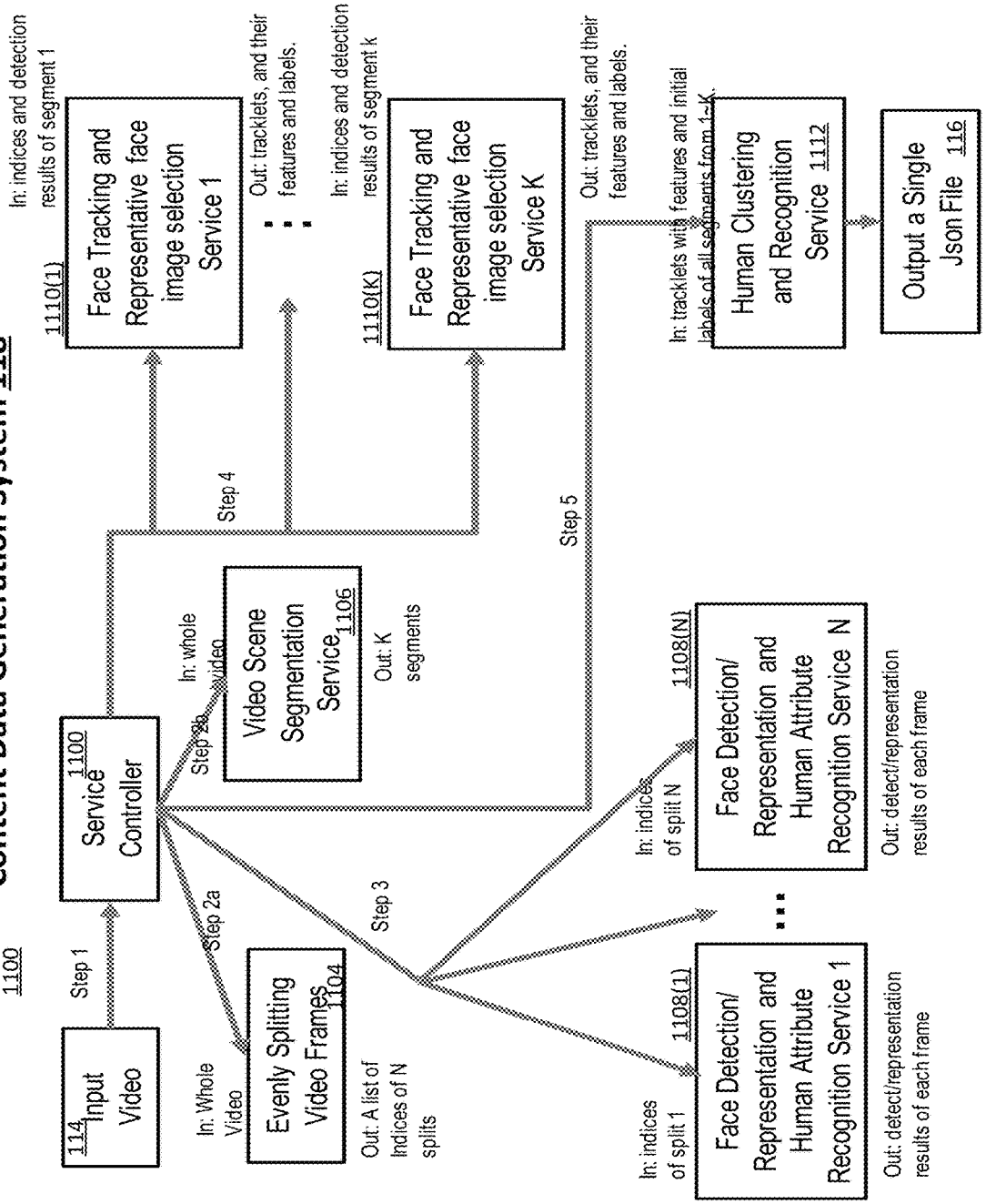
FIG. 12 is a block diagram representing a content data generation system according to example embodiments.

In at least some example embodiments, machine learning based content data generation system 118 is configured to address some of the facial recognition problems identified above, and in this regard a block diagram showing service modules and workflows of an example embodiment of machine learning based content data generation system 118 for generating the people category content data of content data file 116 is shown in FIG. 12. In example embodiments the services described below are software-implemented sub-system modules of content data generation system 118.

As shown in FIG. 12, machine learning based content data generation system 118 includes multiple services that are controlled by a service controller 1100. A video data file 114 is provided as input (Step 1) to the service controller 1100, which provides the video data to two services in parallel, namely a frame splitting service 1104 and a video scene segmentation service 1106. Frame splitting service 1104 evenly splits the entire video into N groups that each include the same number of successive frames and outputs a list of indices for each of the N frame groups (step 2a). Video scene segmentation service 1106 is responsible for dividing or splitting the entire video up into K segments 301(1) to 301(K) (step 2b). As discussed above in respect of FIG. 3, each segment 301 has a segment ID 302, a start time 304 and an end time 306. As noted above, each segment 301 corresponds to a video duration during which a threshold similarity level is maintained over successive video frames, which for example could be a threshold consistency in overall pixel color, background content, people content, or other content or combinations thereof. In one example, segmentation is based on a frame-by-frame comparison of the input video, with the video being split into many continuous scene segments 301(1) to 301(K) on the time axis according to scene changes. In one example a scene change may be detected based on a pixel color change between frame images or a change of their background content. A scene specific video segment 301(j) serves as the basic unit where an independent face tracking task is performed. In at least some example embodiments, video scene segmentation service 1106 is implemented using a pre-trained machine learning based system that is generated using a machine learning algorithm and sample data. By way of example, the sample data used for training could include sample videos and manually determined segment labels. One example of a machine learning based system for video scene segmentation is "Kernel Temporal Segmentation" used by Danila Potapov in his video summarization papers (https://lear.inrialpes.fr/people/potapov/) and Danila Potapov, "Supervised Learning Approaches for Automatic Structuring of Videos. Computer Vision and Pattern RecognitionE [cs.CV]. Université Grenoble Alpes, 2015.

The service controller 1100 then calls on a set of N parallel face detection/representation and human attribute recognition services 1108(1) to 1108(N), such that frame-independent human analysis tasks are grouped together for parallel processing (step 3). Each parallel face detection/representation and human attribute recognition service 1108

(1) to 1108(N) receives a list of indices (generated by the by frame splitting service 1104 in step 2a) for a respective one of the N groups of frames and conducts the following analysis tasks: (a) face detection: using a pre-trained machine learning based face detection system implemented using a deep neural network, the bounding boxes of all candidate faces in each frame are identified for the frames in the group; (b) Human attribute recognition: based on the location of each candidate face, the attributes of the person including one or more of hair color/style and cloth color/texture are recognized; and (c) Face representation: using pre-trained machine learning based face detection implemented using deep neural networks, a face representation is generated for the location of each candidate face. In some examples, speed of the parallel face detection/representation and human attribute recognition services 1108(1) to 1108(N) may be controlled by configuring the services 1108(1) to 1108(N) to only process each Xth frame in a frame group, where X>1 (referred to as speed control), in situations where it is determined that skipping some frames will not reduce accuracy.

Two examples of pre-trained machine learning based face detection systems that are implemented using deep neural networks that can be used in Step 3 are: (1) dlib deep face detector (http://blog.dlib.net/2016/10/easily-create-high-quality-object.html); and (2) Kaipeng Zhang et al: "Joint Face Detection and Alignment using Multi-task Cascaded Convolutional Networks" (https://arxiv.org/ftp/arxiv/papers/1604/1604.02878.pdf).

Figure 13:
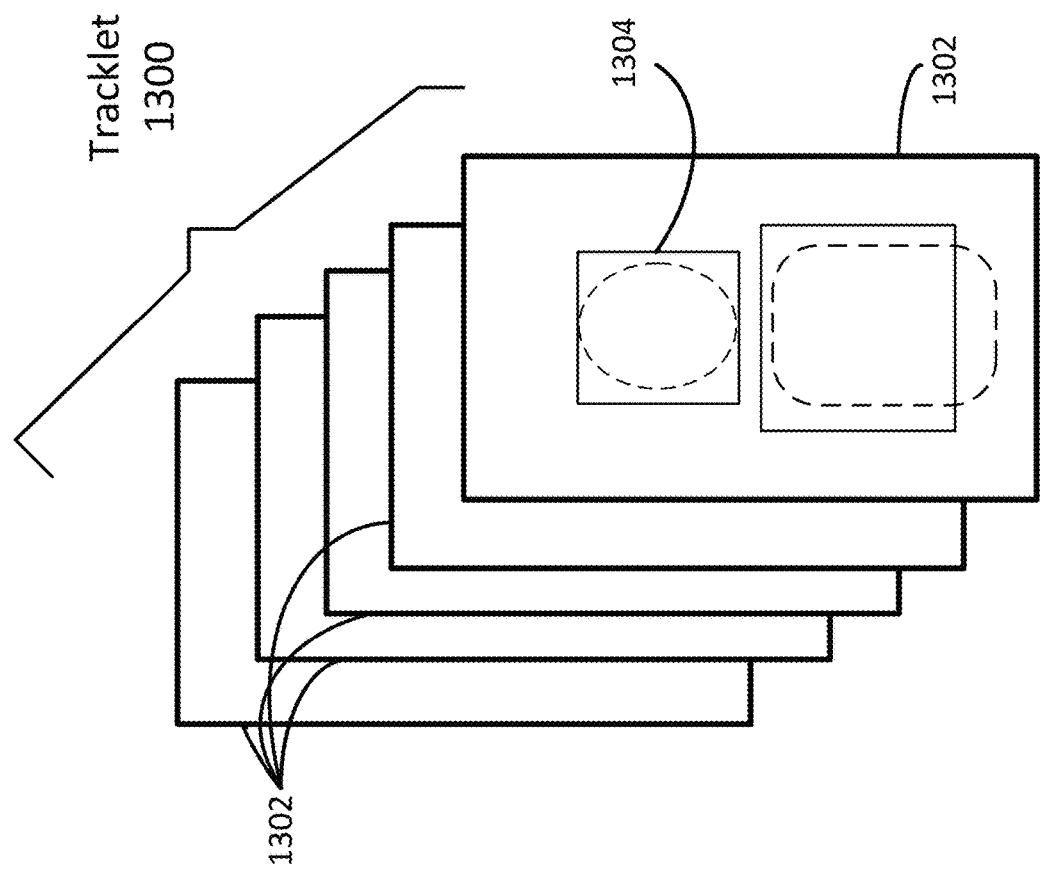
FIG. 13 shows a tracklet.

The service controller 1100 then calls on a set of K parallel face tracking and representative face image selection services 1110(1) to 1110(K) to process the K scene specific video segments (as segmented by video scene segmentation service 1106) in parallel (Step 4). In each scene specific video segment, a background variation (or camera motion) will generally be small, and as a result, foreground objects such as face/human body can be tracked stably though the frames that make up a segment. The tracking method used in step 4 is based on optical flow prediction as well as the face detection and human attribute recognition results from step 3. According to the consistency of face detection results, optical flow prediction and character attributes, adjacent frames 1302 of face images (as defined for example by bounding boxes 1304) are connected to form a tracklet 1300 as shown in FIG. 13. All of the face images in a tracklet 1300 are assumed to come from the same person. Because scene change is small in a scene specific video segment, scene recognition can be efficiently performed in any one of the frames in a segment. In example embodiments, the face tracking and representative face image selection services 1110(1) to 1110(K) are implemented by pre-trained machine learning based system that is generated using machine learning algorithms and sample data. The output for each video segment includes a tracklet 1300 for each detected face, and a list of features for each tracklet (the features are neural network vectors obtained in Step 3), as well as a preliminary label (an identity of the actor in the tracklet).

The service controller 1100 then calls on human clustering and recognition service 1112 (Step 5) to assign a final label to the content (e.g. face) in a segment based on information from the multi-frame tracklet 1300 for the segment. Unlike existing solutions where face recognition is based on a single face image, the tracklet includes information from several frames. This can provide benefits in that a person can be identified by analyzing all the person images (eg. as identified by the bounding boxes defined in step 3) in the tracklet 1300, or by selecting the best image (such as a high-definition frontal face) from the tracklet 1300. This can greatly reduce the impact of profile faces or occlusions, and improve the overall recognition accuracy. In an example embodiment, human clustering and recognition service 1112 is implemented using a pre-trained machine learning based system implemented using a deep neural network that that takes as input a tracklet 1300, and outputs a vector of face feature representation. Recognition and clustering are based on the distance between the representation vectors.

The resulting information is used to generate content data file 116. As noted above, in an example embodiment content data file 116 is formatted as a JSON file. However, content data file 116 could alternatively use any number of data storage formats, including for example database tables, flat files, etc.

Thus, in example embodiments, machine learning based content data generation system 118 includes services that provide: (1) speed adjustable implementation of parallel processing of face detection, human attribute recognition, and face representation tasks (Step 3: services 1108(1) to 1108(N)); (2) face/human tracking based on scene specific video segments (Step 4: services 1110(1) to 1110(K)) (It can be assumed with high confidence that the background and human attributes stay unchanged in a scene specific video segment, which improves the reliability of the generated tracklets); and (3) face representation, recognition and clustering based on tracklets (Step 5: service 1112). Compared to single-image based representation, tracklets based representation can, in at least some applications, enhances recognition accuracy of profile faces and occluded faces.

Although the above description of machine learning based content data generation system 118 has focused on facial recognition techniques that can be used to populate the people category 310 for each video segment in the content data file 116, in example embodiments the machine learning based content data generation system 118 also the same detection, tracking and clustering services to generate data for each of the scene category 308, object category 312 and action category 314 for each of the segments 301(1) to 301(K).

Figure 14:
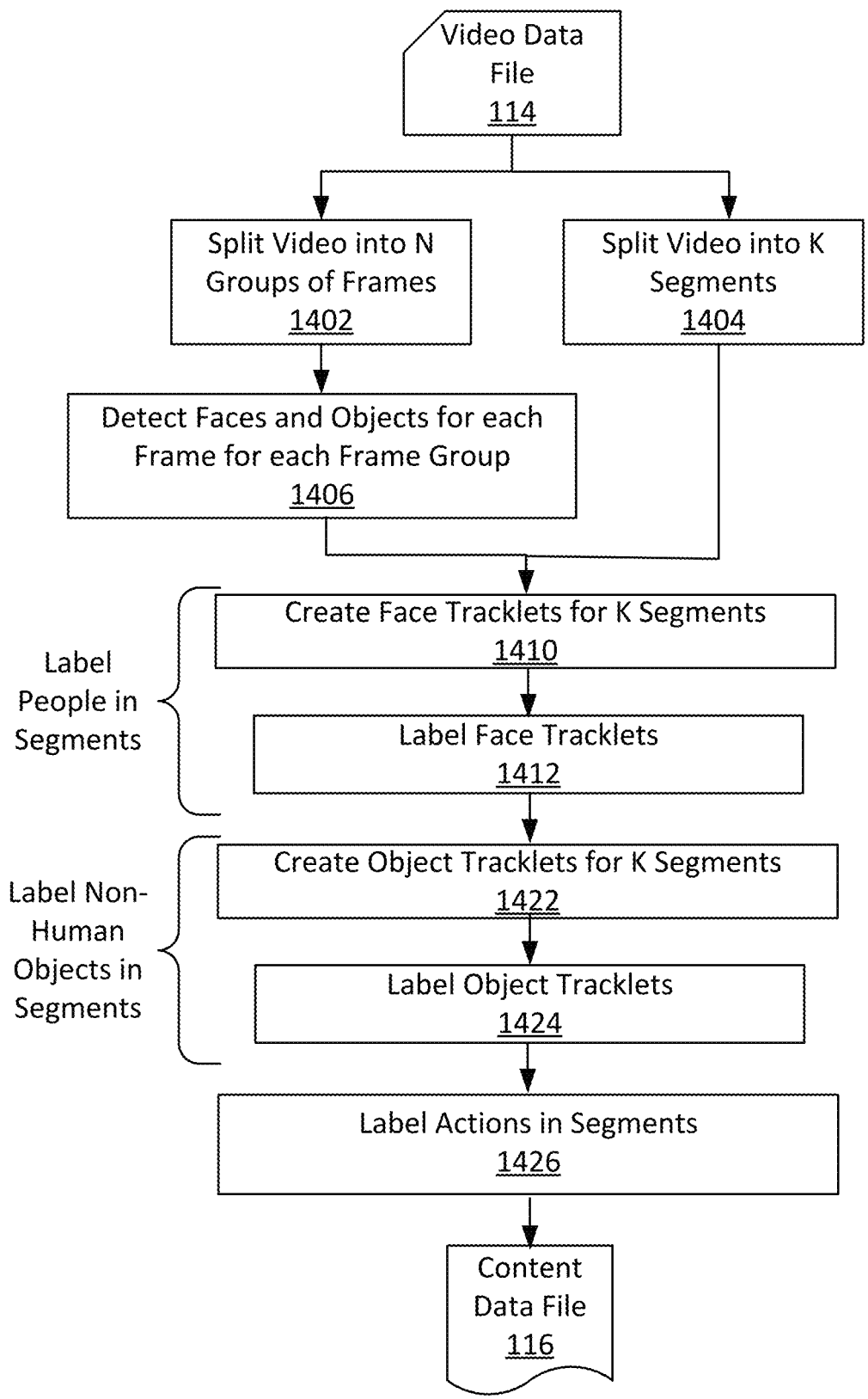
FIG. 14 is a flow chart representing a process performed by the content generation system of FIG. 12.

FIG. 14 provides a flow chart that summarizes the actions taken by machine learning based content data generation system 118 of FIG. 12 to generate content data file 116 in respect of an input video data file 114. In example embodiments, content data file 116 includes data for each video segment 301(j) such as that identified in the table 300 shown in FIG. 3. In particular, in example embodiments, the video segment data for each segment 301(1) to 301(K) includes: a segment ID 302, start time 304, end time 306, a label identifying a scene category 308; labels identifying actors appearing in the segment (people category 310); labels identifying non-human objects appearing in the segment (object category 312); and labels associating one or more actions depicted in the segment (action category 314).

As indicated at block 1402 of FIG. 14, the video data included in video data file 114 is split into N successive frame groups by frame splitting service 1104. In at least some embodiments, each frame group includes the same number of successive video frames. As indicated at block 1406, each of the frame groups is then processed in parallel to detect and identify candidate human faces and human attributes in each of the frames. In example embodiments, human face detection includes defining bounding boxes for each candidate human face detected in a frame. In some examples, facial representation data may be generated that represents the location of each candidate human face in a frame. In some examples, a preliminary label (i.e. an actor name or unique identifier) may be associated with each candidate human face detected in a frame. In some example embodiments, human attributes may be detected and associated with each candidate human face in a frame. Accordingly, in example embodiments, the actions represented in block 1406 results in frame by frame candidate human face detection/representation data that specifies one or more of the following for each frame: a preliminary identifier for each unique candidate human face; bounding box data defining a bounding box for each detected candidate human face; face representation data indicating a location of each candidate human face; and attribute data indicating one or more human attributes for each detected candidate human face (e.g. hair color, hair style, cloth color, cloth texture, eye color, relative facial proportions, presence or absence of facial hair).

In example embodiments, the actions represented in block 1406 can be performed by the N parallel face detection/representation and human attribute recognition services 1108(1) to 1108(N). In some example embodiments, only selected frames from each frame group are processed in block 1406 (e.g. every Xth frame in each frame group). In example embodiments, the number N of frame groups (and respective services 1108(1) to 1108(N)) is predetermined with an objective of optimizing processing speed based on the anticipated complexity of the video data that is to be processed and the resources available for the processing. In some examples, N may be 1.

As noted above, in addition to human faces, in some example embodiments objects other than humans may also be detected and identified by machine learning based content data generation system 118. In some example embodiments, non-human candidate objects are detected and identified as part of the actions of block 1406 using techniques similar to those discussed above in respect of candidate human faces. In such embodiments, machine learning based content data generation system 118 also includes N non-human object detection, representation and attribute recognition services that may operate in manner similar to services 1109(1) to 1108(N), or alternatively, object detection, representation and attribute recognition capabilities may be integrated into the N face detection/representation and human attribute recognition services 1108(1) and 1108(N). Accordingly, in example embodiments, the actions represented in block 1406 also result in frame by frame candidate non-human object detection/representation data that specifies one or more of the following for each frame: a preliminary identifier for each unique candidate object; bounding box data defining a bounding box for each candidate object; object representation data indicating a location of each candidate object; and attribute data indicating one or more attributes for each detected candidate object (e.g. color, texture, complexity, animate or inanimate).

As previously described, the video data included in video data file 114 is split by video scene segmentation service 1106 into video segments 301(1) to 301(K) (represented by block 1404). As noted above, in example embodiments segmentation is scene specific in that the segmentation is performed to split the video data into video segments, with each video segment including a set of successive frames through which a threshold scene consistency is maintained. The scene specific video segments will typically be of varying durations and the number K of segments will depend on number of scene changes in the video data being processed. The scene specific segment data produced by the actions represented by block 1404 includes, for each video segment 301(1) to 301(K): unique segment ID 302, segment start time 304 and segment end time 306. In at least some examples, the video segments 301(1) to 301(K) are each assigned a descriptive scene label by video scene segmentation service 1106 (e.g. beach, castle, dining hall, etc.) which is used to populate the scene category 308 of the scene segment data.

The frame based candidate human face detection/representation data and non-human object detection/representation data produced by the actions of block 1406 and the scene segmentation data produced by the actions of block 1404 are then used to apply final labels to people and non-human objects appearing in each of the segments 301(1) to 301(K).

With regards to human objects such as actors, the actions of labeling actors includes the actions taken by the K face tracking and representative face image selection services 1110(1) to 1110(K) and the actions taken by human clustering and recognition service 1112. In particular, as noted above and indicated in block 1410, the K face tracking and representative face image selection services 1110(1) to 1110(K) are configured to create an actor-specific tracklet 1300 for each unique candidate human face that is detected across the successive frames of a respective segment 301(j). In example embodiments, each actor-specific tracklet 1300 links the candidate human face detection/representation data for that specific actor across the multiple frames of a video segment 301(j). Accordingly, each actor-specific tracklet 1300 provides multiple frames of information for a specific actor that is then used by human clustering recognition service 1112 to apply a final label (i.e. actor identity) to the candidate human face associated with the tracklet 1300, as indicated by block 1412.

At the completion of the actions of blocks 1410 and 1412, machine learning based content generation system 118 has generated the information for the people category 310 of the scene segment data for each of the K video segments 301(1) to 301(K). In particular, the labels assigned to each actor-specific tracklet 1300 can be used as the content to populate the people category 310 for the segments 301(1) to 301(K).

With regards to non-human objects, as represented in block 1422, in example embodiments the content data generation system 118 may include K object tracking and object image selection services to generate object-specific tracklets for each of the scene segments. The K object tracking and object image selection services may be incorporated into or function in a manner similar to the K face tracking and representative face image selection services 1110(1) to 1110(K). As represented in block 1424, machine learning based content data generation system 118 can include an object clustering and recognition service that uses the object tracklet information from multiple frames to apply an object label to each of the object-specific tracklets. The object clustering and recognition service may for example be incorporated into or function in a manner similar to human clustering and recognition service 1112. The labels assigned to each object-specific tracklet 1300 can be used as the content to populate the object category 312 for the respective video segments 301(1) to 301(K).

In example embodiments, as indicated in block 1422, machine learning based content data generation system 118 is also configured to assign action labels to scene segments 301(1) to 301(K). The action labels are then used as content for the actions category 314 (e.g. conversation argument, eating, fighting) for the respective scene segments 301(1) to 301(K). In at least some example embodiments the action labels may be assigned by services that are similar to or incorporated into K face tracking and representative face image selection services 1110(1) to 1110(K) and human clustering and recognition service 1112.

Although example embodiments are described above in the context of videos that include human characters played by actors, video data files 114 and the corresponding content data files 116 can also be provided for non-fiction videos such as news footage, documentaries and sporting events in which case the people appearing may not be professional actors playing a role but rather real people. Accordingly, the term "actor" as used herein refers to people who appear in a subject video whether as themselves or as someone portraying a character. In at least some examples, the label applied to a person may be, in the case of a fictional work, the name of a character they are portraying.

In at least some example, technical benefits of the methods and systems described above include one or more of: 1) improved performance and accuracy in human, scene, object and action recognition in videos with, in some example embodiments, adjustable speed control; 2) highly flexible system architecture, which is compatible with many different single-image based face detection, tracking and recognition models, general object detection/classification models, and scene classification models.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a computer program product or software product. A suitable software product may be stored in a pre-recorded storage device or other similar non-volatile or non-transitory computer readable medium, including DVDs, CD-ROMs, USB flash disk, a removable hard disk, or other storage media, for example. In some examples, the software product is downloadable from a server and can be installed on a processing system, such as processing system 200. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of operating a video viewer on a user equipment, the method comprising:
    displaying a video in a user interface rendered by the video viewer on a
    display device of the user equipment;
    detecting a trigger event to select a scene based video segment of a plurality of successive scene based video segments of the video, each scene based video segment including a respective set of video frames of the video through which a threshold scene consistency is maintained; and
    displaying, in the user interface, a timeline for the video that includes discrete visual timeline markers, each discrete visual timeline marker corresponding to one of the plurality of scene based video segments of the video, each discrete visual timeline marker indicating when specified content appearing in the selected scene based video segment also appears in other ones of the plurality of scene based video segments of the video.

2. The method of claim 1, wherein detecting a trigger event comprises detecting a pause request to pause the video, pausing the video and continuously displaying one of the video frames included in the selected scene-based video segment in the user interface at a time when the pause request was detected.

3. The method of claim 1 comprising:
    detecting selection of one of the discrete visual timeline markers; and
    displaying in the user interface the scene based video segment that corresponds to the selected discrete visual timeline marker.

4. The method of claim 1 comprising displaying, in the user interface, content data about the selected scene based video segment of the video, the content data including one or more labels identifying one or more of: actors appearing in the selected scene based video segment; non-human objects appearing in the selected scene based video segment; scene type of the selected scene based video segment; and actions depicted in the selected scene based video segment.

5. The method of claim 1 wherein the specified content is actors, wherein the discrete visual timeline markers indicate when an actor appearing in the selected scene based video segment of the video also appears in other ones of the plurality of scene based video segments of the video.

6. The method of claim 5 wherein the discrete visual timeline markers indicate when multiple actors appearing in the selected scene based video segment of the video also appear in other ones of the plurality of scene based video segments of the video.

7. The method of claim 1 comprising determining the specified content based on user input received at the user equipment.

8. The method of claim 1 wherein stored content data is associated with the video, the stored content data defining the video as the plurality of scene based video segments, the stored content data including, for each of the plurality of scene based video segments, time information indicating a location and duration of the scene based video segment in the video and content labels identifying at least some of the content appearing therein, the method comprising:
    determining which of the plurality of scene based video segments is the selected scene based video segment based on (i) a time of the video that the trigger event is detected at the user equipment and (ii) the time information included in the content data;

determining the specified content based on the content labels included in the content data for the selected scene based video segment;

determining the other ones of the plurality of scene based video segments that include appearances of the specified content based on the content labels included in the content data for the selected scene based video segment;

determining locations of the discrete visual timeline markers based on the time information included in the content data for the other ones of the plurality of scene based video segments that are determined to include appearances of the specified content.

9. The method of claim 8 comprising generating the content data for the video by:

partitioning the video into the plurality of scene based video segments;

generating the content labels for each scene based video segment based on video data included in a plurality of the video frames included in the scene based video segment.

10. The method of claim 9 wherein generating the content labels for each scene based video segment includes:

linking candidate human face images for each specific actor appearing in the scene based video segment across multiple video frames of the scene based video segment, and using the linked candidate human face images for each specific actor to determine the label for the specific actor.

11. A user equipment device configured to display videos, the user equipment device comprising:

a processing device;

a display device operatively connected to the processing device;

a memory storing instructions that when executed by the processing device cause the user equipment to operate a video player to:

display a video on a user interface of the display device of the user equipment; and detect a trigger event to select a scene based video segment of a plurality of scene based video segments of the video, wherein each scene based video segment includes a respective set of video frames through which a threshold scene consistency is maintained; and display on the user interface of the display a timeline for the video that includes discrete visual timeline markers, each discrete visual timeline marker corresponding to one of a plurality of scene based video segments of the video, each discrete visual timeline marker indicating when specified content appearing in a video frame of the selected scene based video segment of the video also appears in video frames of other ones of the plurality of scene based video segments of the video.

12. The user equipment device of claim 11 wherein the instructions, when executed by the processing device, cause the user equipment to operate the video player to detect a trigger event by detecting a pause request and continuously displaying one of the video frames in the selected scene based video segment in the user interface at a time when the pause request was detected.

13. A method of providing meta information about a video from stored content data associated with the video, the content data including, for each of a plurality of successive scene based video segments of the video, attribute information identifying at least some objects appearing therein, the method comprising:

receiving information selecting one of the plurality of successive scene based video segments, wherein each of the plurality of successive scene based video segment includes a respective set of video frames of the video through which a threshold scene consistency is maintained;

determining, based on the attribute information, one or more objects appearing in the set of video frames included in the selected scene based video segment; and providing, based on the attribute information, timeline information indicating other ones of the plurality of scene based video segments that also have the one or more objects appearing in the set of video frames included therein.

14. The method of claim 13 wherein the objects include human faces.

15. A method of generating a content data file that includes meta-data for a video, comprising:

partitioning the video into a plurality of scene based video segments, each scene based video segment including a respective set of video frames through which a threshold scene consistency is maintained;

for each scene based video segment:

linking candidate human face images for each specific actor appearing in the scene based video segment across multiple video frames of the scene based video segment, determining labels for each specific actor based on the linked candidate human face images for the specific actor, and storing the determined labels for the scene based video segment as metadata in the content data file, the specific actor appearing in the set of video frames included in the scene based video segment also appearing in the set of video frames included in other ones of the plurality of scene based video segments.

16. The method of claim 15 wherein partitioning the video into the plurality of scene based video segments comprises partitioning the video using a neural network trained to segment video into the scene based video segments based on scene variations.

17. The method of claim 15, wherein partitioning the video into a plurality of scene based video segments comprises:

splitting the video into N groups of video frames;

performing one or more of face detection, human attribute recognition and face representation in parallel on each of the N groups of video frames;

wherein, for each scene based video segment, linking the candidate human face images for each specific actor is based on one or more of: face detection, human attribute recognition and face representation.

18. A processing system configured to generate content data that includes meta-data for a video, the processing system comprising:

a processing device;

a memory storing instructions that configure the processing device to:

partition the video into a plurality of scene based video segments, wherein each scene based video segment includes a respective set of video frames through which a threshold scene consistency is maintained;

for each scene based video segment:
    link candidate human face images for each specific actor appearing in the scene based video segment across multiple video frames of the scene based video segment,
    determine labels for each specific actor based on the linked candidate human face images for the specific actor, and store the determined labels for the scene based video segment, the specific actor appearing in the multiple video frames of the scene based video segment also appearing in video frames of other ones of the plurality of scene based video segments.

19. The method of claim 1, wherein detecting the trigger event comprises detecting selection of a timeline display selection button displayed is the user interface.

20. The method of claim 1, further comprising:
    receiving the video from a video player service operating on a content source.

* * * * *